United States Patent
Peirce

[15] 3,690,610
[45] Sept. 12, 1972

[54] CAKE TIER SEPARATOR
[72] Inventor: Patricia Marie Peirce, 2551 W. Ball Street, Anaheim, Calif. 92804
[22] Filed: Nov. 4, 1970
[21] Appl. No.: 86,831

[52] U.S. Cl. .................248/159, 108/101, 211/133
[51] Int. Cl. .................................................A21b 5/00
[58] Field of Search ......248/159, 163; 108/101, 110; 211/133, 134

[56] References Cited

UNITED STATES PATENTS

| | | | |
|---|---|---|---|
| 1,619,818 | 3/1927 | Gowans | 211/134 |
| 1,781,203 | 11/1930 | Teleki | 248/159 |
| 2,178,166 | 10/1939 | Enstrom | 108/101 |
| 2,684,025 | 7/1954 | Kurth | 248/159 |
| 2,921,691 | 1/1960 | Dembinski | 108/101 |
| 3,070,236 | 12/1962 | Macpherson | 108/101 |
| 3,115,253 | 12/1963 | Malbin et al. | 211/128 |
| 3,169,496 | 2/1965 | Muggli et al. | 108/101 |
| 3,236,389 | 2/1966 | Murdock | 108/101 |
| 3,370,369 | 2/1968 | Look | 248/221 |

Primary Examiner—Marion Parsons, Jr.
Attorney—Nienow & Frater

[57] ABSTRACT

The disclosed cake tier separator provides a home baker with a device that is adjustable, sturdy, and reusable. The device comprises a pair of support plates that are spaced apart by a plurality of adjustable length support pillars. These, in turn, comprise a plurality of pillar components that may be disengagably fastened together in an end-to-end manner to form a support pillar of any desired length; the disengagable fastening feature permitting disassembly, and storage for future use. The disclosure also describes various accessories for use with the novel cake tier separator.

10 Claims, 9 Drawing Figures

PATENTED SEP 12 1972 3,690,610
SHEET 1 OF 2
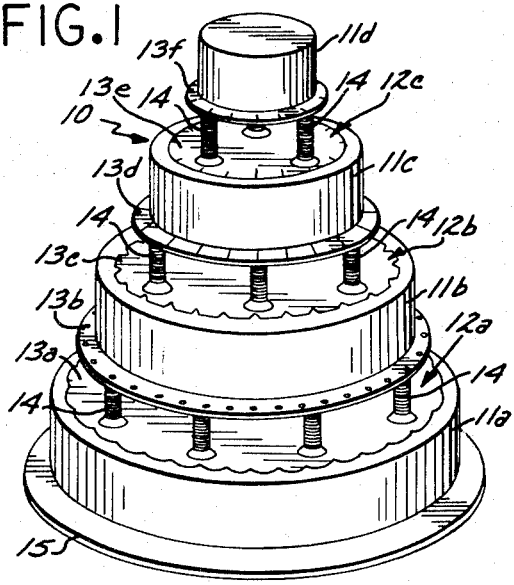
FIG.1
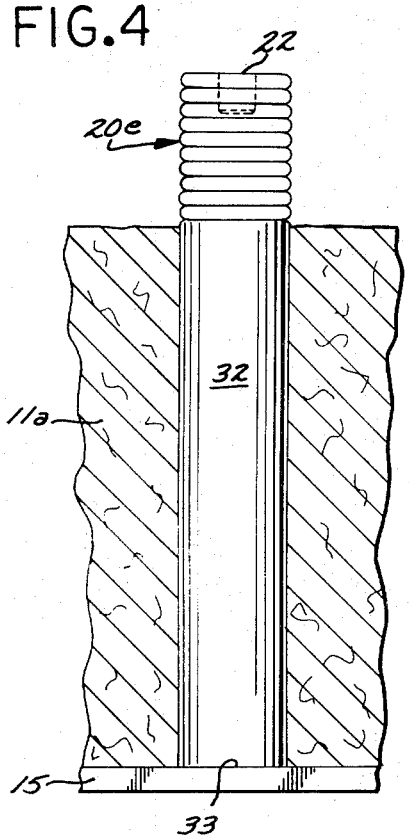
FIG.4
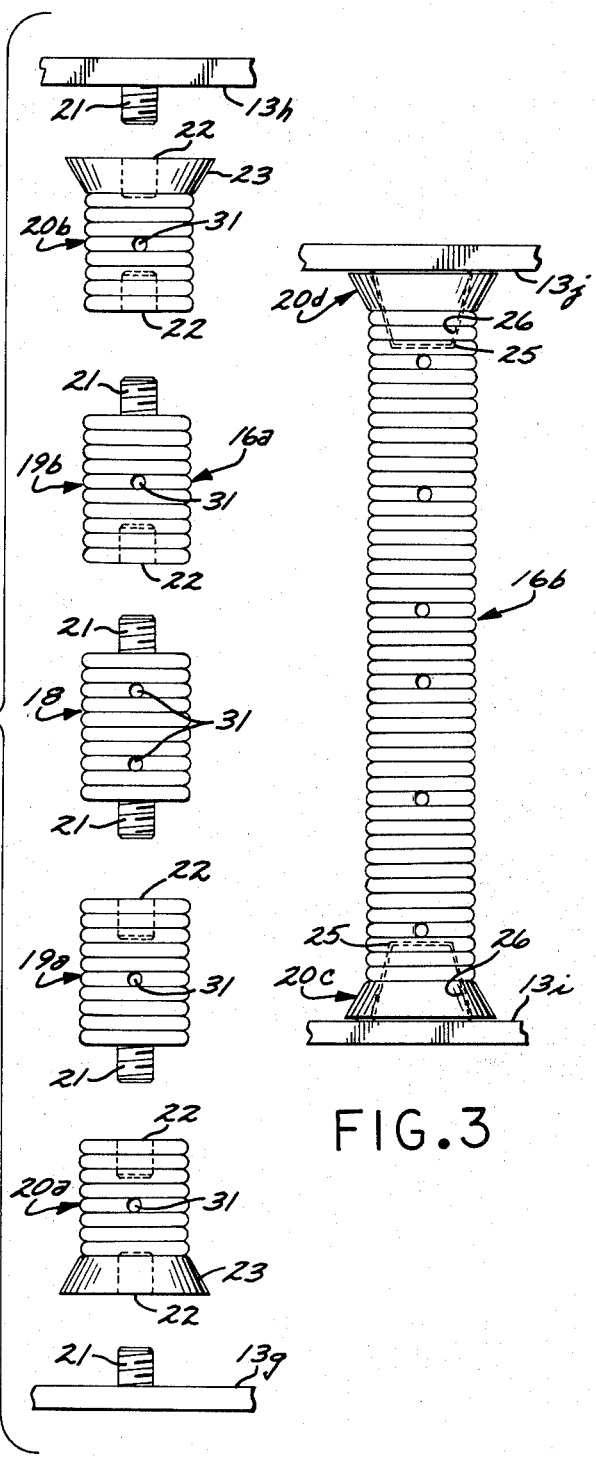
FIG.2
FIG.3
INVENTOR.
PATRICIA MARIE PEIRCE
BY
Nienow & Frater
ATTORNEYS

PATENTED SEP 12 1972 3,690,610

INVENTOR.
PATRICIA MARIE PEIRCE
BY
ATTORNEYS

CAKE TIER SEPARATOR

BACKGROUND

Many of the festive occasions include, as an inherent part of the activities, an ornately decorated cake; and as the attendance grows larger, the cake necessarily increases in size, until eventually it becomes desirable to form the cake into a plurality of tiers, rather than forming the cake into a single extremely large flat cake. To do this, the various cake tiers are assembled into an appropriately decorated multi-tier cake.

It has always been a problem to support the various upper level cake tiers because as the tiers became more numerous, and therefore heavier, the overall cake structure tended to become unbalanced and the lower tiers were in danger of being squashed by the supported weight. The usual solution to this problem was to use tier separators that take the form of two flat parallel plates with suitably sized support pillars positioned between the support plates. The lower support plate is placed on top of one cake tier to distribute the weight and the upper support plate serves as a flat support for the next higher cake tier. Generally, a plurality of dowels is "stabbed" through one or more of the lower cake tiers in order to support the weight of the upper tiers.

The above solution has been fairly satisfactory for commercial bakeries, but has many shortcomings from the point of view of the homemaker. For example, most of the multi-tier cakes are made by commercial bakeries, and to them the cake tier separators are an added expense that must be reduced to a minimum. As a result, these items are generally made of the cheapest materials possible, and they generally result in a flimsy construction that barely serves the desired purpose. Furthermore, in the commercial field, the heights of the various cakes have been fairly well standardized; so that support pillars of only a given length are available. As may be realized, this single length generally does not meet the needs of the home baker. Therefore, the home baker generally has to purchase new support pillars each time she wants to bake a multi-tier cake.

Moreover, since the cake has been prepared for a special occasion, it is often desirable for a special emblem to be incorporated into the cake structure; these emblems taking the form of numerals—for an anniversary or birthday celebration; taking the form of a cupid—for engagement parties; taking the form of a stork—for birth celebrations; taking the form of a lodge emblem for other occasions, etc. Since low cost is such an important factor for the commercial bakeries, these emblems are generally of the clip-on type, and their clip prongs are so thin and weak that sometimes they barely survive delivery of the cake.

Of late, there has been a rennaisance of home baking due partly to the availability of cake mixes, due partly to the high cost and disappointing quality of commercially baked cakes, and due partly to a new trend in homemaking. Whatever the cause, there is presently an increasing demand for cake supplies—particularly cake tier separators and their decorative accessories. Moreover, the present demand is for home type supplies, rather than for commercial type supplies, that can be stored in the home, and will be in condition for re-use whenever the need arises. Therefore, the home type supplies must be stronger, re-usable, better looking, and—preferably—adjustable in size in order to satisfy home needs as to size, weight, height, etc., of the resultant home baked cake.

SYNOPSIS

Broadly stated, the present disclosure describes a novel cake tier separator having a support pillar that comprises four standard component parts, these being disengagably fastened together in an end-to-end relation, by means of end positioned engagement elements, to produce a support pillar of any desired length. The engagement elements of the pillar components are described in terms of a threaded arrangement, and in terms of a frictional arrangement. Various cake decorating accessories that are useful with the disclosed support pillar are also described, these being either affixed to one of the pillar components, or being provided with a mounting disc.

OBJECTS AND DRAWINGS

It is therefore the principal object of the present invention to provide an improved cake tier separator.

It is another object of the present invention to provide an improved adjustable cake tier separator.

It is still another object of the present invention to provide an improved cake tier separator for home use.

It is a further object of the present invention to provide an improved cake tier separator that is re-usable.

It is a still further object of the present invention to provide an improved home type cake tier separator and improved accessories therefor.

The attainment of these objects, and others, will be realized from a study of the following description, taken in conjunction with the drawings, of which FIG. 1 shows an overall simplified view of an undecorated multi-tier cake structure;

FIG. 2 shows an exploded view of the components used for forming the support pillar of one embodiment of the disclosed cake tier separtor;

FIG. 3 shows a view of an assembled support pillar of the cake tier separator;

FIG. 4 shows a view of another component of the disclosed cake tier separator.

DESCRIPTION

Figure 7:
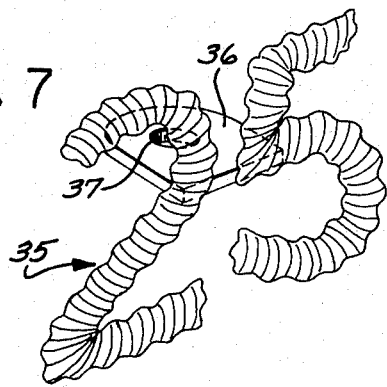
FIGS. 5–9 show accessories for use with the disclosed cake tier separator.

Referring now to FIG. 1, there is shown an overall view of a multi-tier cake structure 10 before decoration. The illustration shows four cake tiers 11a, 11b, 11c, and 11d, these tiers being separated by tier separators 12a, 12b, and 12c, that have the previously mentioned support plates 13a, 13b, 13c, 13d, and 13e. A plurality of support pillars 14 is used for spacing apart the support plates 13.

It is desirable to distribute the weight of the upper tiers over as large an area as possible and to achieve this result, the support plates 13 are made of a fairly rigid sheet plastic (although other materials may be used), and are placed on top of each lower cake tier, as indicated FIG. 1. The support plates 13 may, if desired, extend beyond the actual cake tier, and may, if desired, be covered with decorations (not shown). A lower tray or dish 15 is used for supporting the overall cake structure, and for handling and moving the cake.

The exploded view of FIG. 2 shows one embodiment 16a of the novel disclosed cake tier separator. This is illustrated as comprising a plurality of interconnectable pillar connectors 18; 19a, 19b; and 20a, 20b.

For convenience, these pillar connectors will be designated as primary, or master connector 18; secondary, or extender connectors 19a and 19b; and tertiary or base connectors 20a and 20b.

These connectors are illustrated as being interconnectable by means of separatable engagement elements comprising a male type externally threaded stud 21 and a female type internally threaded socket 22. More specifically, the master connector 18 is illustrated as having a first type of engagement element—a stud 21—at each end thereof; the extender connectors 19 are illustrated as having a male type stud 21 at one end, and as having a complementary second type of engagement element—a female socket 22—at its other end; and the base connector 20 is illustrated as having a second type of engagement element at its proximal end. The other, distal end of the base connector will be discussed in greater detail later.

Alternatively, the master connector 18 may be made with a female type engagement element at each end. In this case, the extender connector would remain the same, except that it would be used in a reversed orientation relative to that discussed; but the base connector would require a male type engagement element at its proximal end, and this would modify the engagement element arrangement between it and the support plate.

It will be noted that the various connectors illustrated in FIG. 2 tend to take the form of an elongated cylinder with the engagement elements positioned at their ends. The connectors are—typically—about 1 and ½ inches long, and about three-quarters of an inch in diameter. When a plurality of such connectors are assembled—or disengagably fastened together by means of their separatable engagement elements, they form an adjustable length support pillar for the cake tier separator—as shown in FIG. 3.

In FIG. 3, the overall support pillar 16b presents a desirable unitary appearance, and this result is achieved as follows. It will be noted that the external surfaces of the pillar connectors 18, 19, and 20 of FIG. 2 have a plurality of closely spaced horizontal peripheral ribs, so that when the overall support pillar 16 is assembled, these adjacent ribs tend to mask the jointures between the various individual pillar connectors. A similar masking effect can be achieved by other external surface configurations, and even by providing an extremely smooth exterior surface for the pillar connectors.

The support pillar 16b of FIG. 3 has been assumed to have been assembled from the pillar components shown in FIG. 2, thus comprising a centrally positioned master connector 18, two intermediately positioned extender connectors 19, and two terminally positioned base connectors 20. It is obvious that the overall length of the resultant support pillar may be lengthened or shortened by insertion or omission of selected pillar connectors. Moreover, the relative locations of the various pillar connectors may be varied, as will be discussed more fully later.

Referring back to FIG. 2, it will be noted that the base connectors 20a and 20b were shown to have an enlargement 23 at their distal ends to provide improved contact with support plates 13g and 13h. While this improved contact may be desirable, it is not essential—often merely providing an enlarged area for basal decoration of the base portion of the pillar.

However, FIG. 2 illustrates the distal ends of base connectors 20a, 20b, to have female type engagement elements 22 for fastening to male type studs 21 of support plates 13. Under some conditions of manufacture, it may be inconvenient to provide the flat support plates 13 with such protruding threaded male type studs 21; and FIG. 3 indicates a somewhat different type of engagement element.

In FIG. 3, the pillar/plate engagement elements comprise a conical countersunk hole 25 base connectors 20c, 20d; and a conical protrusion 26 in the support plates 13i and 13j. These conical configurations are relatively easy to produce; and are suitably sized and dimensioned to provide a frictional fit between the support pillar 16b and the support plates 13. If desirable, improved holding means—such as bayonet fastenings, ring and groove detents, etc.—may be incorporated into the frictional engagement elements in order to provide even better holding ability.

The above discussed conical protrusions and/or conical holes may alternatively be of the vane type, rather than of the continuous surface type, the vane type construction comprising a plurality of vanes whose edges are suitably shaped, tapered, and positioned to stimulate a conical surface—these providing the desired frictional engagement. Of course, such frictional engagement elements may be substituted for all the threaded engagement elements previously discussed.

The adjustable length support pillars 16 of FIGS. 2 and 3 have been discussed primarily in terms of a solid pillar connectors having threaded or conical ends, as this type of construction produces a desirably strong, reusable support pillar structure; but it is apparent that the pillar connectors may be tubular, and therefore somewhat lighter in weight. Furthermore, since the disclosed pillar connectors are to be of the home type, and preferably re-usable, it is also desirable that they be readily cleanable. It has been found that many present day plastics (e.g., styrene, Lucite, etc.) have desirable combinations of lightweight, high strength, cleanability, etc.; and are readily formed into the desired items discussed above. Moreover, if Lucite is used, its optical qualities lend themselves to many novel lighting effects that may be obtained by incorporating lights into the cake tier separating structure.

The previously discussed embodiment was described as having a master connector 18 that had a male type, or a female type engagement element at each end thereof; this particular master connector structure providing the advantage that all the extender connectors and the base connectors may then be standardized. Stated in another way, only one single type of master connector is needed. Similarly, only one single type of extender connector is needed; and this may be used at any location in the support pillar—in fact, additional extender connectors may be inserted into the support pillar at any location in order to extend the support pillar to any desired length. Conversely, the extender connectors may be omitted from, or removed from, the support pillar in order to shorten the support pillar to a desired length. Likewise, only a single type of base connector is needed, and this may be used at either end of the support pillar. If desired, the enlarged base of the base connector may be eliminated. It should also be noted that the master connector does not have to be centrally located in the support pillar, but may be positioned at any desired location—the advantages of this will be discussed later in greater detail.

The above mentioned location interchangability of the various pillar connectors has another advantage, which will be appreciated from the following discussion. As may be realized, the home cake baker is generally quite artistic; and usually uses her own individual ideas about cake decorating. These decorating ideas frequently require leaves or similar decorating accessories; and it has been found that improved decorating effects can be achieved by providing some decorating accessories with mounting wires that permit them to be readily mounted, and/or twined around the support pillar.

As shown in FIG. 2, the master connector 18 is preferably provided with one or more wire holes 31 for receiving the mounting wires of the decorating accessories. However, it frequently happens that the desired leaf motif is such that the leaf should be placed near the top or the bottom of the support pillar; and the previously mentioned advantage of freely positioning the master connector and its wire holes permits the wire-mounted leaf to be located where desirable.

The above use of the freely positionable master connector and its wire holes has one disadvantage; namely, the decorations must be visualized in advance in order to position the master connector and its wire holes at the optimum location. One way to ameliorate the situation is to provide wire holes 31 in all the pillar connectors, as indicated in FIG. 2. This arrangement assures a plurality of conveniently positioned wire holes, one of which will be at, or near, the desired location—and thus obviates the need for disassembling and then reassembling the support pillar for the purpose of locating a wire hole at the desired location.

As previously indicated in connection with the discussion of FIG. 1, each cake tier separator comprises a pair of parallel support plates 13 that are spaced apart by a plurality of support pillars 14. In order to support plate 13 has a given number of engagement elements—such as studs 21, cones 26, or the like—positioned on a surface of the support plate 13 to receive a set of support pillars 14. To accomplish this, the free ends of the base connectors of a set of support pillars are disengagably fastened to respective ones of the engagement elements of the support plate 13. In this way, a plate/pillar combination of desired plate size and pillar length is achieved for each level of the multi-tier cake.

It may be noted at this point that the support plates 13 preferably range in diameter from about 5 inches to about 18 inches, in increments of about one inch between adjacent sizes. Moreover, the support plates 13 preferably have peripheral marking to facilitate the spacing and dimensioning of the decorations; and these markings may, as indicated in FIG. 1, take the form of scalloping, dimples, notches, marks, etc.

It is also preferable that the larger support plates 13 have one or more centrally positioned support pillars in order to support the weight of the larger, more numerous, and therefore heavier tier structure. For similar reasons, progressively smaller support plates may have progressively fewer support pillars; until the smallest support plate may have provisions for only three support pillars.

There are some instances when due to the soft texture of a cake, or due to the number of tiers that are to be used, it is not desirable to use a support plate atop the bottom-most layer of cake. In order to solve this problem, the base connector 20e of FIG. 4 may be used. This base connector, instead of having a surface for resting on a support plate, has a long shank 32 that terminates in a cut-off end 33. Base connector 20e is used by "stabbing" its elongated shank 32 through the bottom-most layer 11a of cake, until the shank's cut-off end 33 comes to rest against the tray 15 that is being used to support the overall cake structure. In this way, the lower layer of cake is protected from undue squashing. Base connector 20e has, at its proximal end, an engagement element—such as a socket 22—so that it can be incorporated into a support pillar in the manner previously discussed.

Figure 5:
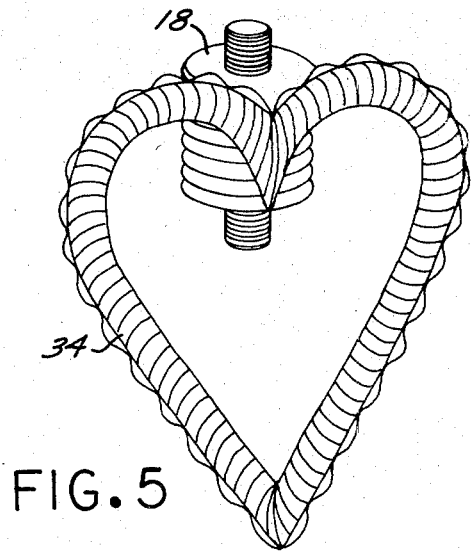

As indicated above, it is frequently desirable to incorporate an emblem into the cake structure; and FIG. 5 shows one such emblem, a heart 34. This emblem is illustrated, in FIGS. 5 and 6, as being affixed to a master connector 18; but it is apparent that it may be affixed to any of the disclosed pillar connectors. Due to the location interchangability of the various pillar connectors, the emblem thus affixed may therefore be placed at any desirable height or location of any of the support pillars.

Figure 8:
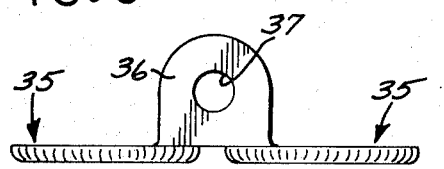
Figure 6:
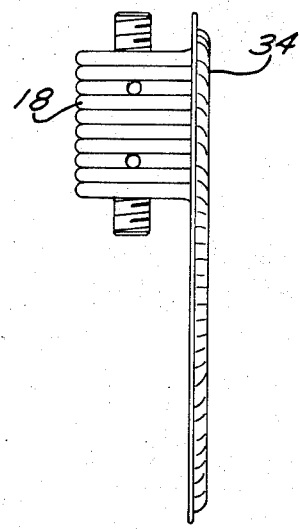

Due to the use of threaded engagement elements previously discussed, there is a possibility that the affixed emblem of FIGS. 5 and 6 may end up facing inwardly of the cake, rather than facing outwardly as desired. FIG. 7 illustrates an arrangement for solving this problem. Here, another typical emblem—in this case an anniversary emblem 35—is shown to comprise a mounting disc 36 having a mounting hole 37. If desired, emblem 35 may be integral with the mounting disc 36, or may be bonded thereto. FIG. 8 shows a top view of the emblem 35 and the mounting disc 36.

Figure 9:
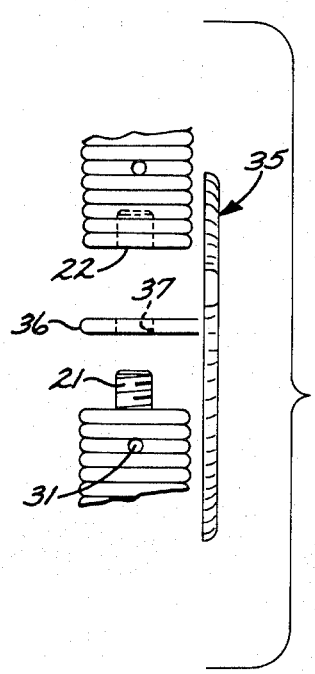

FIG. 9 illustrates, in an exploded side view, the method of incorporating the emblem into the support pillar structure. The mounting hole 37 of the mounting disc 36 is positioned over a stud 21, which is then engaged, with a complementary engagement element 22 of an adjacent pillar connector. Just before the final tightening of the overall support pillar, the emblem 35 is turned to face it in the desired direction; and the overall support pillar is then tightened—thus holding the emblem 35 firmly in place, and facing in the desired direction relative to the cake structure.

It will be noted that the mounting disc 36 slightly increases the overall length of the support pillar; but this increased length is so small that it can be ignored. Alternatively, a dummy disc may be inserted into the other support pillars of that cake tier separator.

I claim:

1. A variable length cake tier support comprising in combination, a plurality of relatively short fixed length pillar connectors each of which is provided with means for interconnecting contiguously a quantity thereof to produce a support of length corresponding to the desired distance between cake tiers, said means enabling disconnection of said connectors for re-use in providing a support of lengths corresponding to a different desired distance between cake tiers, whereby a multiplicity of different length supports can be selectively formed from a given plurality of said connectors.

2. The combination of claim 1 wherein said interconnecting means comprises a threaded engagement arrangement.

3. The combination of claim 1 wherein said interconnecting means comprises a frictional engagement arrangement.

4. The combination of claim 1 wherein said connectors have means, comprising surface configurations, for masking the jointure between said contiguously arranged connectors.

5. The combination of claim 1 including an emblem affixed to one of said connectors.

6. The combination of claim 1 including an emblem having a mounting disc adapted to be positioned between adjacent said pillar connectors.

7. The combination of claim 1 wherein at least one of said pillar connectors has means for affixing a wire decoration.

8. A cake tier support, comprising in combination, a primary connector having at its opposite ends a given engagement element; a secondary connector having at one end thereof an engagement element substantially identical to said given engagement element and at its opposite end an engagement element complemental thereof; said connectors being interconnected by engagement of a given element and said complemental element to expose two given elements, a base having an engagement element corresponding to said complemental element interconnected with one of said exposed given elements, and a cake tier plate formed with an engagement element corresponding to said complemental element interconnected with the other exposed given element.

9. A cake tier support according to claim 8 wherein said given elements and those complemental thereof are of male and female construction respectively.

10. A cake tier support according to claim 9 wherein said given elements are formed with male fastening threads and said complemental elements are formed with female fastening threads.

* * * * *